3,078,279
BENZOPHENONE-TETRACARBOXYLIC
DIANHYDRIDES
John H. McCracken, Monroeville Borough, and Johan
Gustav David Schulz, Pittsburgh, Pa., assignors to Gulf
Research & Development Company, Pittsburgh, Pa., a
corporation of Delaware
No Drawing. Filed Sept. 1, 1960, Ser. No. 53,359
2 Claims. (Cl. 260—346.3)

This invention relates to new compounds and more particularly to anhydrides of polyaryl ketones. The new compounds of this invention can be employed as curing agents for epoxy resins.

The new anhydrides of this invention can be represented in general by the following structural formula:

wherein R and $R_1$, the same or different, are aryl radicals containing one or more rings, at least one of which is an aromatic ring directly attached to the carbon in said formula, such as phenyl, biphenyl, naphthyl, phenanthryl, anthryl, indyl, dihydronaphthyl, cyclohexylphenyl, etc., said aryl radicals containing an anhydride grouping,

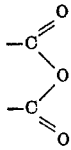

attached to adjacent positions on said aryl radical, said positions being located at least two positions away from said carbon in said formula. The remaining positions on the aryl radicals can include diverse radicals such as fluoride, chloride, bromide, iodide, $NO_2$, $SO_3H$, COOH, COOR, wherein R is an alkyl group, $NH_2$, OH, etc. Specific compounds which are included within the scope of the above structural formula are benzophenone 3,4,3',4'-tetracarboxylicdianhydride, benzophenone 2-bromo, 3,4,3',4'-tetracarboxylicdianhydride, benzophenone 5-nitro, 3,4,3',4'-tetracarboxylicdianhydride, benzophenone 2-carboxy, 2'-sulfo, 3,4,3',4'-tetracarboxylicdianhydride, benzophenone 2-amino, 3,4,3',4'-tetracarboxylicdianhydride, etc.

Compounds which can be employed to obtain the new anhydrides of this invention can be defined in general by the following structural formula:

wherein $R_2$ and $R_3$, the same or different, are aryl radicals containing one or more rings, at least one which is an aromatic ring directly attached to the carbon in said formula, such as phenyl, biphenyl, naphthyl, phenanthryl, anthryl, indyl, dihydronaphthyl, cyclohexylphenyl, etc., said aryl radicals carrying as nuclear substituents at least two radicals defined by $R_4$, said latter radicals being located at least two positions away from said carbon in said formula; and $R_4$ is selected from the group consisting of primary, secondary and tertiary alkyls having from one to 16 carbon atoms, preferably from one to eight carbon atoms, such as methyl, ethyl, n-propyl, isopropyl, isobutyl, amyl, isoamyl, hexyl, isooctyl, decyl, tetradecyl, hexadecyl, etc. The remaining positions on the aromatic rings can include radicals such as said diverse radicals defined hereinabove as well as alkyl groups having from one to 10 carbon atoms. It is critical in order to obtain the new anhydrides of this invention that the nuclear substituents on the aromatic rings, defined above by $R_4$, be located at least two positions away from the carbon in the structural formula immediately above, otherwise the compounds produced will not be anhydrides but could be lactones. Examples of compounds which can be employed as charge in order to obtain the new anhydrides of this invention are 1,1-bis(3,4,3',4'-tetramethylphenyl)ethane, 1,1 - bis(2,2'-dibromo, 3,4,3',4' - tetramethylphenyl)ethane, 1-(3-methyl, 4-ethylphenyl) 1-(2'-nitro, 3',4'-diethylphenyl)ethane, 1,1-bis(3,4,3',4'-tetramethyl, 5-aminophenyl)ethane, 1,1-bis(3-ethyl, 4-butylphenyl)isobutane, 1-(3,4-diethylphenyl) 1-(3',4'-diisopropylphenyl)ethane, 1,1 - bis(3,4,3',4' - tetramethylphenanthryl)ethane, 1-(3-methyl-4-isopropylnaphthyl) 1-(3',4'-diethylanthryl) ethane, etc. The preferred compound which can be employed as charge is di-ortho-xylylethane.

In order to obtain the new anhydride of this invention the charge defined above is subjected to oxidation with nitric acid having a concentration of about 5 to about 70 percent, preferably about 20 to about 40 percent. The amount of nitric acid employed, determined as the molar ratio of 100 percent nitric acid relative to the charge, is about 8.0 to about 17.0, preferably about 8.0 to about 12. The residence time required for the oxidation can be from about one minute to about 48 hours, preferably about 10 minutes to about two hours. Temperatures of about 110° to about 350° C., preferably about 150° to about 250° C., can be employed. Pressures sufficient to maintain the reaction system primarily in the liquid phase, from about atmospheric to about 500 pounds per square inch gauge or higher, are satisfactory. Upon completion of the reaction, the reaction product is permitted to cool down, preferably to room temperature, until a solid precipitate is formed. This may require, for example, from about 4 to about 24 hours. The crystals are separated from the liquid in any convenient method, for example, filtration, and then dried, for example, at a temperature of about 110° to about 170° C. for about 4 to about 24 hours. The crystals remaining are the anhydrides of this invention.

The invention can further be illustrated by reference to the following example.

*Example I*

Into a stainless steel autoclave of approximately 4,5-liter capacity fitted with a stirrer, internal cooling coil, external electric heaters and means for manually venting gases to the atmosphere, there were placed 238 grams (one mol) of di-ortho-xylylethane and 2960 grams of 30 percent nitric acid. The temperature in the autoclave was raised to 200° C. gradually over a period of three hours and held at 200° to 210° C. for an additional hour. The gases were vented intermittently so that the pressure was gradually allowed to climb to 265 pounds per square inch gauge. The reaction product was cooled to about 25° C. over a period of two hours and then discharged from the autoclave. After standing overnight a considerable amount of solid had precipitated. This was filtered off and the filtrate evaporated to approximately one-fifth of its original volume and cooled. The second crop of crystals was filtered off and the filtrate evaporated under vacuum. A total of 279 grams of oven-dried product was thus obtained. Infrared absorption data show that the purified product melting at 225° to 226.5° C. is the dianhydride having the following structural formula:

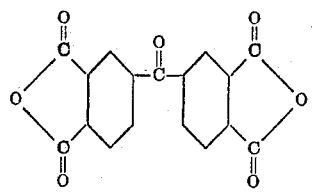

Obviously many modifications and variations of the invention as hereinabove set forth can be made without departing from the spirit and scope thereof and therefore only such limitations should be imposed as are indicated in the appended claims.

We claim:
1. An anhydride having the following structural formula:

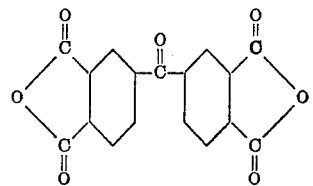

2. An anhydride having the following structural formula:

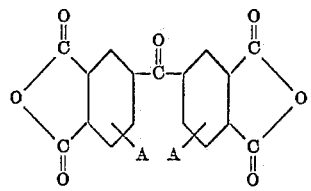

wherein A is selected from the group consisting of hydrogen, halogen, —NO$_2$, —COOH, —SO$_3$H and —NH$_2$.

References Cited in the file of this patent
Golding: Polymers and Resins (1959), pages 355–60.